United States Patent [19]
Buthe et al.

[11] 3,786,776
[45] Jan. 22, 1974

[54] ALARM DEVICE ON A CLUTCH

[75] Inventors: Theo Buthe; Manfred Kugler, both of Lohmar/Rheinl, Germany

[73] Assignee: Jean Wallerscheild, GmbH, Lohmar/Rheinl, Germany

[22] Filed: Sept. 5, 1972

[21] Appl. No.: 286,278

[30] Foreign Application Priority Data
Jan. 14, 1972    Germany............................ 7201226

[52] U.S. Cl. .............. 116/67 R, 64/30 E, 192/30 W
[51] Int. Cl. .............................................. G08b 3/00
[58] Field of Search 116/67 R; 64/30 R, 30 C, 30 E; 192/30 W

[56] References Cited
UNITED STATES PATENTS
2,411,600   11/1946   Spase .................................. 64/30 E Primary Examiner—Louis J. Capozi
Attorney, Agent, or Firm—Edmund M. Jaskiewicz

[57] ABSTRACT

The clutch is provided with a driven hub on which is mounted a sleeve having a number of leaf springs attached in such a manner that the free ends of the springs are freely moveable and the springs are positioned at an increasing radial distance from the periphery of the sleeve. The clutch housing as the driven member, is provided with a ring having a plurality of axial extensions which are engaged by the free ends of the leaf springs. Relative movement between the driven and driving members causes the free ends of the leaf springs to move rapidly over the axial extensions and produce an audible signal indicating the relative movement.

5 Claims, 3 Drawing Figures

ALARM DEVICE ON A CLUTCH

The present invention relates to clutches, more particularly, to an alarm device for indicating relative movement between the driving and driven members of the clutch.

Various forms of friction or ratchet clutches that limit the transmitted torque to a predetermined value are employed as overload safety devices, particularly on agricultural mechines. Such an overload clutch is generally positioned between the power take-off shaft of an agricultural tractor and the machine or implement being driven by this shaft. When the transmitted torque exceeds a predetermined value a relative movement occurs between the driven and driving members and no torque is transmitted. However, if such clutch is operated at an overload for a long period of time and this overload operation is not noticed by the tractor operator the clutch may be overloaded to such an extent as to become inoperative.

It has been proposed to utilize an electrical circuit to sense the relative movement between the driving and driven members of a clutch and to generate an acoustical or audible signal in response to such an overload condition. However, this type of a safety arrangement was disadvantageous in that considerable modification was necessary in the tractor. Further, such an alarm system usually requires substantial modifications to both the tractor and every implement which was to be driven by the tractor. In addition, the use of electrical devices on agricultural machines gives rise to numerous problems resulting from the rough conditions under which agricultural machines are generally used.

Since clutch alarm devices utilizing an electrical circuit are not suitable for rough operation and since electrical connections must be manually established between the clutch member driven by the tractor and the clutch member attached to the implement so that the alarm becomes operative when each argicultural implement is attached to the tractor, efforts have been made to produce an alaram device for clutches that eliminates electrical circuits and renders it unnecessary to make manual connections of adjustments in order to make the device operative. As far as it is known, to date a satisfactory clutch alarm device possessing these characteristics has not been developed.

It is therefore the principal object of the present invention to provide a novel and improved alaram device for indicating relative movement between the driving and driven members of a clutch.

It is another object of the present invention to provide a clutch having an alarm which is simple in construction, reliable in operation and which is operative immediately after connecting a driven element to the drive shaft.

It is an additional object of the present invention to provide an alarm which generates an audible signal to indicate relative movement between the driving and driven parts of a clutch and which is reliable in operation under all operating conditions in a purely mechanical manner.

The objects of the present invention are attained and the disadvantages of the prior art as described above are eliminated by the alarm device for a clutch disclosed as the present invention. The present invention essentially discloses a sleeve coaxially mounted on a clutch hub, which is the driving member, with a plurality of leaf springs being mounted on the periphery of the sleeve in such a manner that one end of each sleeve spring is attached to the sleeve and the other end is freely moveable. A ring is attached to the housing or other driven member of the clutch so as to rotate therewith and is provided with a plurality of axially extending abutments or extensions which are positioned to be engaged by the free ends of the leaf springs. The lengths of the leaf springs are such that when there is a relative movement between the driving and driven parts of the clutch the free ends will move over the axial extensions and provide a loud acoustical signal which will be readily apparent to the tractor operator.

The alarm device for the clutch according to the present invention is advantageous since an acoustical signal is generated in a purely mechanical manner without any dependence upon electrical circuits and the alarm device is a component of the clutch. The alarm device is therefore always ready for operation when the clutch is mounted on the driving end of a power take-off shaft.

As confirmed by actual tests in the field, the audible signal produced as the leaf springs strike the axial abutments when the clutch is actuated is so strong that it exceeds considerably the sound level produced by the tractor and the agricultural implement driven thereby. The noise of the audible signal is therefore readily evident to the tractor operator and cannot possibly be ignored. Other forms of sound generators such as bells and other sounding elements did not produce such a loud and distinctive audible signal as that of the present invention.

Other objects and advantages of the present invention will be apparent upon references to the accompanying description when taken in conjunction with the following drawings, which are exemplary, wherein.

Proceeding nest to the drawings wherein like reference symbols indicate the same parts throughout the various views, a specific embodiment of the present invention will be described in detail.

Figure 1:
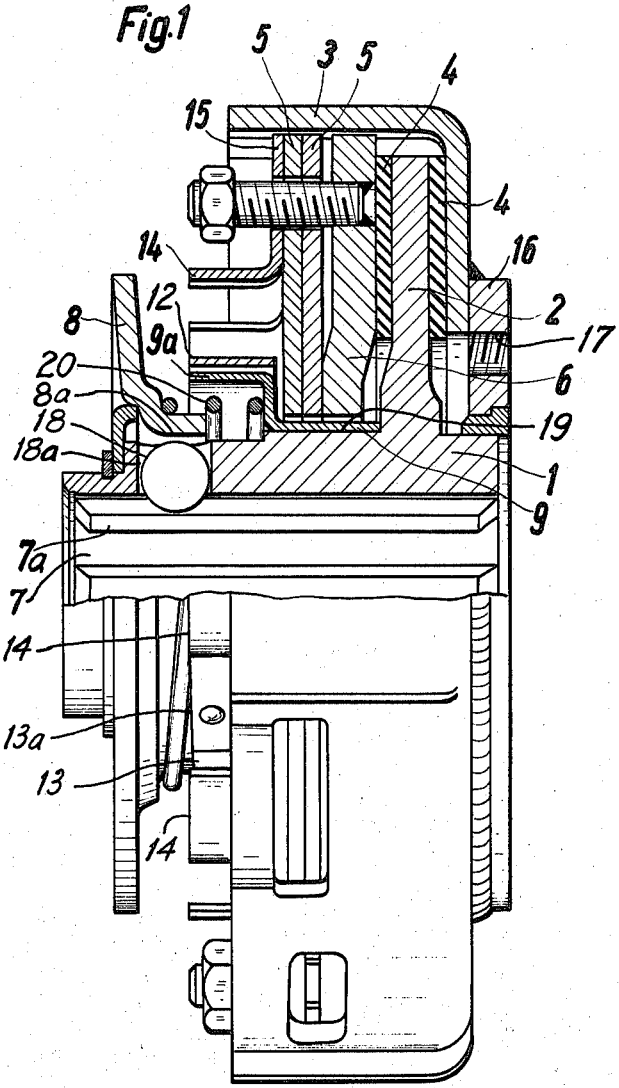
FIG. 1 is a side elevational view of a clutch incorporating the alarm device of the present invention with the upper half of the clutch being shown in a longitudinal section.
Figure 2:
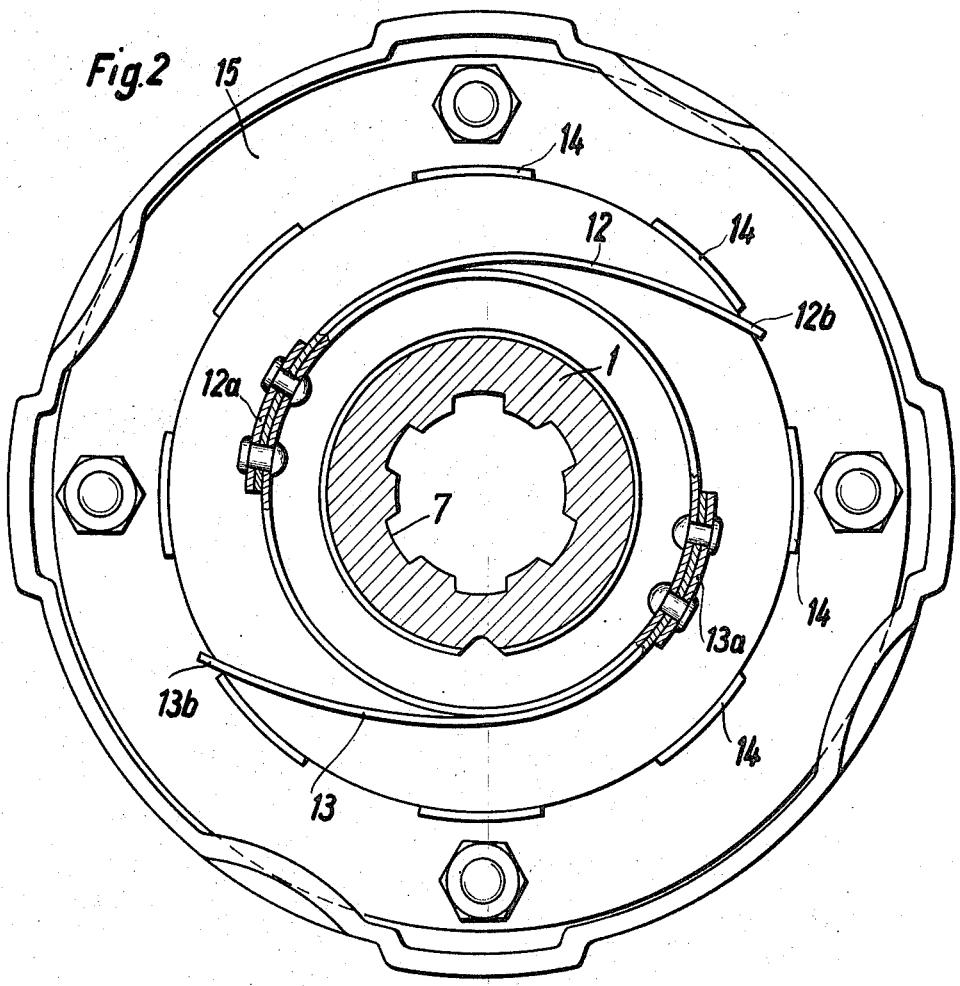
FIG. 2 is a front elevational view of the clutch of FIG. 1 with the hub immediately forward of the leaf springs being shown in section.

As may be seen in FIG. 1 the clutch comprises a clutch hub 1 having a clutch disc 2 integral therewith, a clutch housing 3 within which is positioned the clutch hub, friction discs 4 positioned on both sides of the clutch disc 2 and a thrust washer or pressure disc 6 secured against rotation but axially displaceable in the housing 3. Also within the housing are plate springs 5 which exert a force against thrust washer 6. The springs 5 press friction discs 4 against disc 2 of the clutch hub 1.

The clutch hub 1 together with the clutch disc 2 comprises the driving member of the clutch and the clutch housing comprises the driven member. The clutch hub 1 has a bore 7 with axial splines 7a therein in order to effect a non-rotative driving connection with the power take-off shaft of a tractor. The clutch housing 3 has an outer flange plate 16 having a plurality of threaded bores 17 to provide a connection to a flange on a jointed shaft mounted on agricultural implement which is to be driven by the tractor.

The hub 1 is further provided with a spring biased locking member which urges a ball 18 into an annular groove on the power take-off shaft (not shown) so as to fix the clutch axially thereon.

Figure 3:
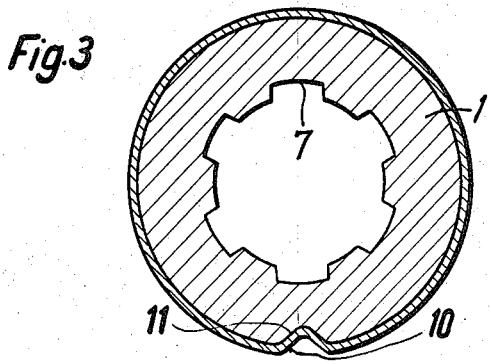
FIG. 3 is a sectional view through the clutch hub and sleeve mounted thereon showing the manner in which these elements are secured together against rotation.

The components constituting the alarm device comprise a sleeve 9 which is slid onto the cylindrical portion 19 of clutch hub 1 and attached thereto against rotation by means of a depressed portion 10, see FIG. 3, in the sleeve which is inserted in a recess or groove 11 in the clutch hub 1. The depressed portion and the groove may extend throughout the entire length of the cylindrical portion of the hub or only through a small axial section of the hub and sleeve respectively.

The sleeve 9 is formed so as to have a larger diameter cylindrical portion 9a which surrounds a portion of the closure member 8 and is positioned coaxially with respect to the clutch hub 1. The closure member 8 is urged outwardly or to the left as viewed in FIG. 1 by means of a spiral spring 20 which is positioned between the closure member 8 and a surface on the sleeve 9. The closure member 8 has a sleeve portion 8a which covers the balls 18 and retains the balls in the annular groove of the power take-off shaft which is received in the bore 7. By moving the closure member 8 to the right, as viewed in FIG. 1, the balls 18 can be moved radially outwardly within their bores 18a so as to be disengaged from the groove of the power take-off shaft. The clutch can then be removed from the shaft. Two leaf springs 12 and 13 are attached at their respective ends 12a and 13a to the outer periphery of the cylindrical portion 9a of sleeve 9 by means of rivets or other suitable fasteners. The leaf springs are positioned on the periphery of axial portion 9a uniformly or may be positioned non-uniformly thereon.

The leaf springs 12 and 13 extend in the peripheral direction of the cylindrical portion 9a but at an increasing radial distance to cylindrical portion 9a over a length which is such that the free ends 12b and 13b engage axial abutments 14 when the clutch is actuated.

Abutments 14 are axial extensions on a ring 15 and are arranged uniformly about the periphery of the ring. The present embodiment provides for eight such abutments but it is to be understood this number may be varied.

The leaf springs 12 and 13 taper in width toward their free ends 12b and 13b, the taper can be seen in FIG. 1.

The axial abutments 14 are positioned at a radial distance with respect to the cylindrical portion 9a of sleeve 9. The ring 15 is mounted on the driven portion of the clutch such as by being mounted to the clutch housing 3 for rotation therewith and without the possibility of any axial displacement. The plate springs 5 may rest against ring 15 or clutch housing 3.

It is readily apparent that should an overload of the clutch occur, there will be a relative movement between the driving and driven members of the clutch. This relative movement will occur between thrust washer 6 or clutch housing 3 and hub 1. The resulting relative movement will cause the free ends 12b and 13b of the leaf springs to continuously strike the axial abutments 14 and to produce a loud and distinct noise which will be readily apparent to the operators of the machinery. The noise is quite loud and may be compared to an extremely loud buzzing sound.

Thus it can be seen that the present invention has disclosed a simple yet effective alarm device which produces a distinct and clear audible signal upon relative movement between the driving and driven parts of a clutch. Further, the alarm device is operative immediately upon connection of the clutch and no further installation or adjustment measures are necessary to prepare the alarm device for operation. As confirmed by actual test, the audible signal produced is sufficiently loud and distinct so as to give a clear and immediate indication that relative movement is occurring between the driving and driven members of the clutch.

It is understood that this invention is susceptible to modification in order to adapt it to different usages and conditions and, accordingly, it is desired to comprehend such modifications within the invention as may fall within the scope of the appended claims.

What is claimed is:

1. In a clutch having an alarm device for indicating relative movement between the driving and driven members of the clutch, the combination of a clutch hub defining a driving member, a sleeve fixed coaxially on said hub and having its outer periphery spaced from the hub, a plurality of leaf springs having one ends thereof attached to the outer periphery of said sleeve and their other ends projecting freely so as to be moveable, a clutch housing defining a driven member, means for drivingly engaging said driving and driven members, a ring mounted on said housing for rotation therewith, and a plurality of axial extensions on said ring extending over said leaf springs and engageable by the free ends of said leaf springs whereby relative movement between said driving and driven members causes said leaf spring free ends to move over said axial extensions to produce an audible signal indicating relative movement.

2. In a clutch as claimed in claim 1 wherein two leaf springs extend at increasing radial distances from the periphery of the sleeve and their free ends extend beyond the periphery of said axial extensions.

3. In a clutch as claimed in claim 1 wherein said hub has a notch in the periphery thereof, said sleeve has a depressed portion seated in said hub notch to secure said sleeve against rotation with respect to said hub.

4. In a clutch as claimed in claim 1 wherein said leaf springs taper inwardly from their attached ends toward toward their free ends.

5. In a clutch as claimed in claim 1 wherein said sleeve comprises a first axial portion having a diameter conforming to that of said hub so as to fit closely thereover and an annular portion extending outwardly of one end of said first axial portion, a second axial portion being positioned at the outer periphral edge of said annular portion and having a greater diameter than that of said first axial portion, said leaf springs being attached on the outer peripheral surface of said second axial portion.

* * * * *